US012657067B2

(12) United States Patent
Li et al.

(10) Patent No.: US 12,657,067 B2
(45) Date of Patent: Jun. 16, 2026

(54) PRIVATE NETWORK AND EDGE APPLICATION PROVISIONING MANAGEMENT SYSTEM, METHOD AND COMPUTER READABLE MEDIUM THEREOF

(71) Applicant: CHUNGHWA TELECOM CO., LTD., Taoyuan City (TW)

(72) Inventors: Wen-Sheng Li, Taoyuan City (TW); Hung-Yuan Wang, Taoyuan City (TW); Wei-Chih Lu, Taoyuan City (TW); Jia-An Tsai, Taoyuan City (TW); Chun-Hao Chen, Taoyuan City (TW)

(73) Assignee: CHUNGWA TELECOM CO., LTD., Taoyuan City (TW)

( * ) Notice: Subject to any disclaimer, the term of this patent is extended or adjusted under 35 U.S.C. 154(b) by 419 days.

(21) Appl. No.: 18/215,538

(22) Filed: Jun. 28, 2023

(65) Prior Publication Data

US 2024/0311205 A1     Sep. 19, 2024

(30) Foreign Application Priority Data

Mar. 16, 2023    (TW) ................................. 112109788

(51) Int. Cl.
G06F 9/50        (2006.01)
G06F 9/455       (2018.01)

(52) U.S. Cl.
CPC ........ G06F 9/5072 (2013.01); G06F 9/45558 (2013.01); G06F 2009/45595 (2013.01)

(58) Field of Classification Search
CPC .............. G06F 9/5072; G06F 9/45558; G06F 2009/45595
See application file for complete search history.

(56) References Cited

U.S. PATENT DOCUMENTS

2020/0374974 A1* 11/2020 Sun ......................... H04L 41/20
2022/0377131 A1* 11/2022 Szilagyi .............. H04L 41/0894
2022/0417757 A1* 12/2022 Gupta ................... H04W 16/02

* cited by examiner

*Primary Examiner* — Kamal M Hossain
(74) *Attorney, Agent, or Firm* — RANKIN, HILL & CLARK LLP

(57)        ABSTRACT

The present disclosure provides a private network and edge application provisioning management system and a method thereof, which provides a construction of enterprise private cloud platform and a process of management standardization, so that a dedicated cloud operating environment can be provided for enterprise customers, and special software application services can further be established and managed. A remote registration mechanism, an enterprise private network establishment mechanism, and an edge application activation mechanism be proposed in the present disclosure. In this way, edge computing capabilities in the enterprise private network environment can be provided, which can not only reduce application service latency time, but also network transmission does not need to go through the Internet, thus having the advantages of avoiding data leakage and improving security. The present disclosure also provides a computer-readable medium for executing the method of the present disclosure.

7 Claims, 9 Drawing Sheets

PRIVATE NETWORK AND EDGE APPLICATION PROVISIONING MANAGEMENT SYSTEM, METHOD AND COMPUTER READABLE MEDIUM THEREOF

BACKGROUND

1. Technical Field

The present disclosure relates to a technology for provisioning enterprise private networks, in particular, to a system and a method for private network and edge application provisioning management and a computer-readable medium thereof.

2. Description of Related Art

In the 5G era, communication is gradually spreading from person-to-person to thing-to-thing, such as the Internet of Things (IoT), smart factories, and self-driving cars, etc. Therefore, traffic between application terminals and application services is growing exponentially. At present, issues such as limited network bandwidth, communication latency, data privacy and lack of network coverage are coming to the forefront, and the traditional centralized deployment architecture is no longer sufficient. Hence, the European Telecommunications Standards Institute (ETSI) proposed the Multi-access Edge Computing (MEC) architecture to deploy services at the edge as much as possible to provide users with proximal access to meet the needs or characteristics of the application services. The MEC architecture is designed to provide users with proximal access to meet the requirements or characteristics of application services, such as high bandwidth and low latency, while reducing the need for all data traffic to be transmitted over the Internet and avoiding network congestion.

In order to meet the needs of digital transformation of enterprises, for example, to realize vertical field operations such as smart manufacturing and smart factories, various service providers have proposed different single implementation systems or methods to support edge computing or 5G mobile networks. However, these technologies lack mechanisms to integrate user application services and mobile networks, and their manageability is also insufficient.

Therefore, it is essential for enterprises to provide a technology for enterprise private network construction and management. Especially, under the trend of edge computing and 5G enterprise private network, it is necessary for enterprises to have application services closer to terminal devices or data sources for data analysis and real-time operation, and it is also necessary for enterprises to have an edge computing infrastructure management system and a complete edge cloud platform to manage related applications. This is the goal that people in this technology field will be eager to pursue.

SUMMARY

For achieving the above goal and others, the present disclosure provides a private network and edge application provisioning management system, including: a centralized visualization module configured to provide an operation interface for a user to manage an enterprise private cloud platform, so as to enable an enterprise private network service, provisioning a network, and deploy and manage various edge application services on the enterprise private cloud platform; a central information database configured to store information related to the edge application services and an enterprise private network of the enterprise private cloud platform, so as to provide browsing information corresponding to different users according to permissions of the users, wherein the browsing information is displayed by the centralized visualization module; an enterprise private network provisioning module configured to handle network establishment of the enterprise private network, wherein the network establishment includes provisioning of a virtualized multi-access edge computing (MEC) network element and connection management of a base station and a core network; an edge application provisioning module configured to perform lifecycle management of an edge application service and to provide application service communication (e.g., 5G) network provisioning function and enterprise internal network connection provisioning function; and an edge management module configured to execute and process commands issued by the enterprise private network provisioning module and the edge application provisioning module, so as to manage and control a lifecycle and network settings of the edge application service.

In an embodiment, the enterprise private network provisioning module determines whether the enterprise private network is added for a first time. When the enterprise private network is added for the first time, the enterprise private network provisioning module reads Peripheral Component Interconnect (PCI) standard network interface card information configured by the virtualized multi-access edge computing network element in the enterprise private cloud platform, and obtains a port number of a network switch to provision the virtualized multi-access edge computing network element according to information for initializing the base station and the core network during a registration. When the enterprise private network is not added for the first time, the enterprise private network provisioning module changes information of the port number of the network switch, or increases or decreases information of connectable base stations, so as to automatically update corresponding network protocol and routing rules.

In an embodiment, the edge application provisioning module performs provisioning with an image file of the edge application service existing. After deployment parameters are adjusted, the edge application provisioning module provisions the edge application service as a virtual machine or a container on the enterprise private cloud platform according to a type of the image file to finish network provisioning of the enterprise private network, network segment modification of an enterprise network, or provisioning of connection function of the enterprise network.

In an embodiment, the edge management module calls the virtual machine instance management module, the container instance management module and the edge network control module to perform various operation commands (such as deployment/modification/deletion) on virtual machine services, container services, and switches or routers of the enterprise private cloud platform, respectively.

In an embodiment, the private network and edge application provisioning management system further includes: an enterprise private cloud platform edge cloud registration visualization module configured to provide a cloud central visualization interface for the user to register a plurality of the enterprise private cloud platforms, and to monitor registration progress and states of the enterprise private cloud platforms; an edge end information database configured to record information and state of each of the enterprise private cloud platforms, and to differentiate the enterprise private cloud platforms by different area identification codes; a centralized edge cloud registration management module configured to process remote registration of the enterprise private cloud platforms, and to record configuration information of services running on the registered enterprise private cloud platforms in the edge end information database; and an edge cloud registration operation module configured to receive an instruction issued by the centralized edge cloud registration management module to execute corresponding actions to achieve the remote registration of all of the enterprise private cloud platforms, wherein the centralized edge cloud registration management module coordinates and manages all edge cloud registration operation modules in a unified manner.

In the aforementioned embodiments, after hardware equipment of the enterprise private cloud platform is completely installed, the edge cloud registration operation module sends a registration notification to the centralized edge cloud registration management module, so that the centralized edge cloud registration management module confirms that the private cloud platform is not yet registered and then sends instructions in three stages to request the edge cloud registration operation module to respectively activate the edge management module, to adjust settings of the edge management module according to environment information, and to perform data initialization and cloud platform resource establishment of the edge management module.

The present disclosure further discloses a private network and edge application provisioning management method, which is executed by computer equipment. The method includes the following steps: determining, by an enterprise private network provisioning module, whether an enterprise private network is added for a first time; when the enterprise private network is added for the first time, reading PCI standard network interface card information configured by a virtualized multi-access edge computing network element in an enterprise private cloud platform, and obtaining a port number of a network switch to set corresponding network protocol and routing rules according to information for initializing the base station and the core network during a registration to provision the virtualized multi-access edge computing network element; when the enterprise private network is not added for the first time, and when physical network equipment is to be updated, changing information of the port number of the network switch so as to automatically update corresponding network protocol and routing rules, or when a number of base stations is to be updated, increasing or decreasing information of connectable base stations so as to automatically update corresponding network protocol and routing rules.

The above method further includes: updating, by an edge application provisioning module, deployment parameters when an image file of an edge application service to be deployed exists; deploying the edge application service as a virtual machine or a container on the enterprise private cloud platform according to a type of the image file, so that a state of the edge application service is "in processing," and changing the state of the edge application service from" in processing" to "running" after the deployment is completed; and determining, by the edge application provisioning module, whether an enterprise private network is already provisioned to complete network provisioning of the enterprise private network, or whether to modify a network segment of an enterprise network to complete the segment modification of the enterprise network, or whether to provision the enterprise network to provision a connection function of the enterprise network.

The above method further includes: receiving, by an edge management module, commands issued by the enterprise private network provisioning module and the edge application provisioning module, and performing various operations (such as deployment/modification/deletion) respectively on virtual machines services, container services, and switches or routers of the enterprise private cloud platform by calling the virtual machine instance management module, the container instance management module and the edge network control module.

The above method further includes: after hardware equipment of the enterprise private cloud platform is completely installed, sending, by an edge cloud registration operation module, a registration notification to a centralized edge cloud registration management module; and after the centralized edge cloud registration management module confirms that the private cloud platform is not yet registered, sending instructions in three stages to request the edge cloud registration operation module to respectively activate the edge management module, to adjust settings of the edge management module according to environment information, and to perform data initialization and cloud platform resource establishment of the edge management module.

The present disclosure further discloses a computer-readable medium, storing instructions therein, when executed by a computing device or a computer, cause the computing device or the computer to implement the aforementioned private network and edge application provisioning management method.

In view of the above, the private network and edge application provisioning management system, its method and its computer-readable medium according to the present disclosure mainly adopts technologies such as cloud-native, virtualized/software-based computing/storage/networking, edge computing to provide a hardware/software all-in-one machine with 5G mobile network (including core network and base station) to help enterprises with building a private network environment that satisfies various vertical field scenarios. Specifically, the present disclosure provides an enterprise private cloud platform construction and standardized registration process to enable enterprise customers to have a dedicated cloud operating environment, and further establish and manage dedicated software application services. Take a smart factory for example, the software application services may include real-time data analysis services for factory machines and real-time adjustment services for production lines, etc. In summary, the present disclosure can provide edge computing capability in an enterprise private network environment, thereby reducing application service latency and eliminating the need for delivering traffic through the Internet, thereby avoiding data leakage and improving security.

BRIEF DESCRIPTION OF THE DRAWINGS

The present disclosure can be more fully understood by reading the following descriptions of the embodiments, with reference made to the accompanying drawings.

DETAILED DESCRIPTION OF THE EMBODIMENTS

The following examples are used for illustrating the present disclosure. A person skilled in the art can easily conceive the other advantages and effects of the present disclosure, based on the disclosure of the specification. The present disclosure can also be implemented or applied as described in various examples. It is possible to modify or alter the following examples for carrying out the present disclosure without contravening its spirit and scope, for different aspects and applications.

Figure 1:
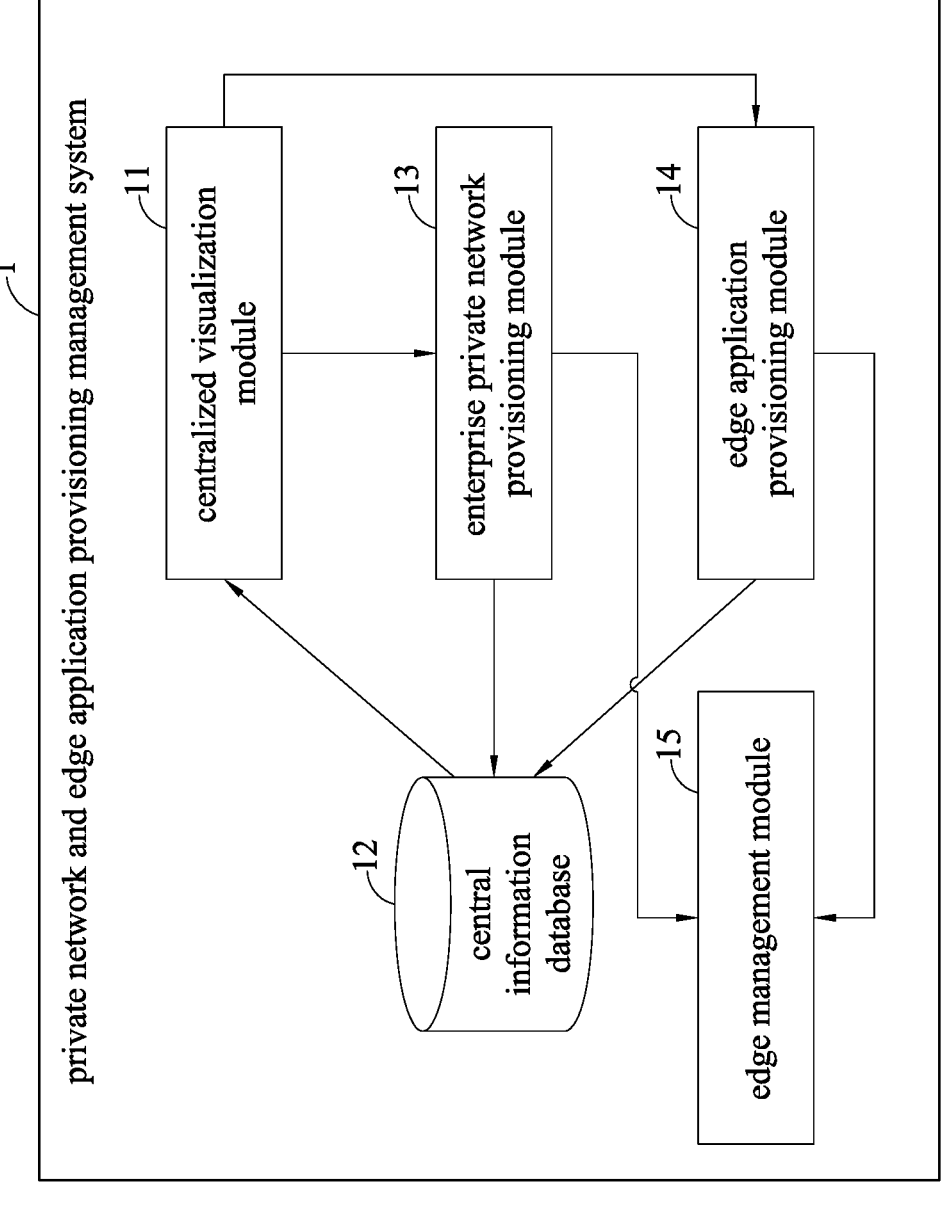
FIG. 1 is a system architecture diagram of an embodiment of a private network and edge application provisioning management system according to the present disclosure.

FIG. 1 is a system architecture diagram of a private network and edge application provisioning management system according to the present disclosure. As shown in the figure, the present disclosure contains two major mechanisms, which are enterprise private cloud platform and edge application provisioning mechanism as well as enterprise private cloud platform remote registration mechanism, so as to form a private network and edge application provisioning management system. The private enterprise network construction and edge application construction provisioning mechanism is described first. As shown in FIG. 1, the private network and edge application provisioning management system 1 includes a centralized visualization module 11, a central information database 12, an enterprise private network provisioning module 13, an edge application provisioning module 14, and an edge management module 15.

The centralized visualization module 11 is configured to provide an operation interface for a user to manage an enterprise private cloud platform, so as to enable enterprise private network services, setup the network, and deploy and manage various edge application services on the enterprise private cloud platform. In short, the centralized visualization module 11 provides a friendly user interface for managing the enterprise private cloud platform, so as to enable enterprise private network services, setup the network, and deploy and manage various edge application services through and on the enterprise private cloud platform.

Specifically, the centralized visualization module 11 provides a visualizable interface that allows the user to manage one or more registered enterprise private cloud platforms in a remote and centralized manner, and perform various management operations, such as managing and controlling the lifecycles of application services on the enterprise private cloud.

The central information database 12 is configured to store the information related to the edge application services and the enterprise private network of the enterprise private cloud platform, so as to provide browsing information corresponding to different users according to permissions of the users, and the browsing information is displayed by the centralized visualization module 11. In other words, the central information database 12 is mainly configured to store the information related to the application services and the enterprise private network of the enterprise private cloud platform, and provide browsable information according to different user permissions, which is displayed by the friendly graphical interface of the centralized visualization module 11.

The enterprise private network provisioning module 13 is configured to handle the network provisioning for enterprise private networks, which includes the provisioning of virtualized multi-access edge computing (MEC) network elements and the management of connections between base stations and the core network. In short, the enterprise private network provisioning module 13 is configured for handling the setup of enterprise private networks, which may include the provisioning of virtualized MEC network elements and the management of connections between base stations and the core network.

Specifically, the enterprise private network provisioning module 13 can schedule and manage the virtualized MEC network elements on the enterprise private cloud platform and provide the network connection between the virtualized MEC network elements, the base stations and the core network, and provide the function to update the OpenFlow rules corresponding to changes of connections of network port of L2 physical switch devices, and set routing rules to the MEC network elements at the first virtual router gateway (Gateway-1) of the L3 physical router devices. In addition, if it is necessary to increase or decrease the base stations connected to the private cloud platform of the enterprise private network, this change can be made through the enterprise private network provisioning module 13, and the related OpenFlow rules can be updated at the same time. By adjusting the number of connected base stations, the mobile network signal coverage in the enterprise private network can be dynamically changed to provide mobile terminal devices such as mobile phones, tablets, and IoT devices with access to internal application services.

The edge application provisioning module 14 is configured to perform the lifecycle management of edge application services and provide 5G network provisioning for application services and provisioning for enterprise intranet connections. In short, the edge application provisioning module 14 is configured for lifecycle management of edge application services, providing 5G network access for application services and connections provisioning for enterprise intranet (e.g., office physical network, wireless network, etc.).

Specifically, the edge application provisioning module 14 provides users with the ability to manage the application services on the enterprise private cloud platform, including lifecycle operations such as provisioning, modification and deletion, and to connect to the mobile network and the enterprise's existing physical network. For example, mobile terminal devices such as mobile phones, tablets, and IoT devices can access the application services on the private cloud platform through base stations, and connect to the enterprise's existing physical network (e.g., office network, wireless network, etc.) through personal computers to access application services on the enterprise private cloud platform.

The edge management module 15 is configured to execute the commands issued by the enterprise private network provisioning module 13 and the edge application provisioning module 14, so as to manage and control the lifecycle and network-related settings of the edge application service. In short, the edge management module 15 exists at the edge end and is configured for handling the commands issued by the central cloud modules such as the enterprise private network provisioning module 13 and the edge application provisioning module 14, and managing and controlling the lifecycle and network-related settings of edge application services.

In an embodiment, the enterprise private network provisioning module 13 determines whether the enterprise private network is added for the first time before executing the provisioning of the enterprise private network. If it is added for the first time, the enterprise private network provisioning module 13 reads the PCI network interface card information configured by the virtualized multi-access edge computing network elements in the enterprise private cloud platform, and then obtains the port number of the network switch, and then performs the provisioning of the virtualized multi-access edge computing network elements according to the information for initializing the base station and core network when they are registered. In addition, if it is not the first time to add an enterprise private network, the information of the port number of the network switch is changed, or the information of connectable base stations is increased or decreased, and the corresponding network protocol and routing rules are updated automatically.

In an embodiment, the edge application provisioning module 14 determines whether the image file of an edge application service exists before executing the provisioning of the edge application service. If it exists, the edge application provisioning module 14 executes the provisioning, and then adjusts the deployment parameters, and then provisions the edge application service in the enterprise private cloud platform as a virtual machine or a container according to the type of the image file, so as to finish procedures such as the network provisioning of the enterprise private network, the modification of segments of the enterprise network, or the setup of the connection function of the enterprise network.

In an embodiment, the edge management module 15 can call the virtual machine instance management module, the container instance management module and the edge network control module, to perform provision/modify/delete operation commands on virtual machine services, container services, and switches or routers of the enterprise private cloud platform, respectively. In other words, the edge management module 15 performs related operations on virtual machine services, container services, and switches or routers of the enterprise private cloud platform through the virtual machine instance management module, the container instance management module, and the edge network control module.

Specifically, the edge management module 15 is the core module of the enterprise private cloud platform, which is configured for managing and controlling the virtual machine instance management module, the container instance management module and the edge network control module at the edge end. When the edge management module 15 receives a control command from the central end, the control command will be classified according to its type. The edge management module 15 calls the virtual machine instance management module when the control command is classified as an operation related to virtual machines. The edge management module 15 calls the container instance management module when the control command is classified as an operation related to containers. The edge management module 15 calls the edge network control module when the control command is classified as a network operation related to OpenFlow rules for L2 switches or routing tables of L3 routers.

The most important part of the aforementioned enterprise private cloud platform and the edge application provisioning mechanism is providing edge computing capability at the local end, which allows users to transfer cloud services to be executed at the local end, execute application services on an enterprise private cloud platform that is already registered, and provide enterprise private network provisioning function and edge application provisioning function, so as to enable mobile terminal devices such as mobile phones, tablets, and IoT devices to directly access internal application services within the service area of base stations without going through relatively long Internet transmission paths, which can meet the need of applications for high bandwidth and low latency.

Figure 2:
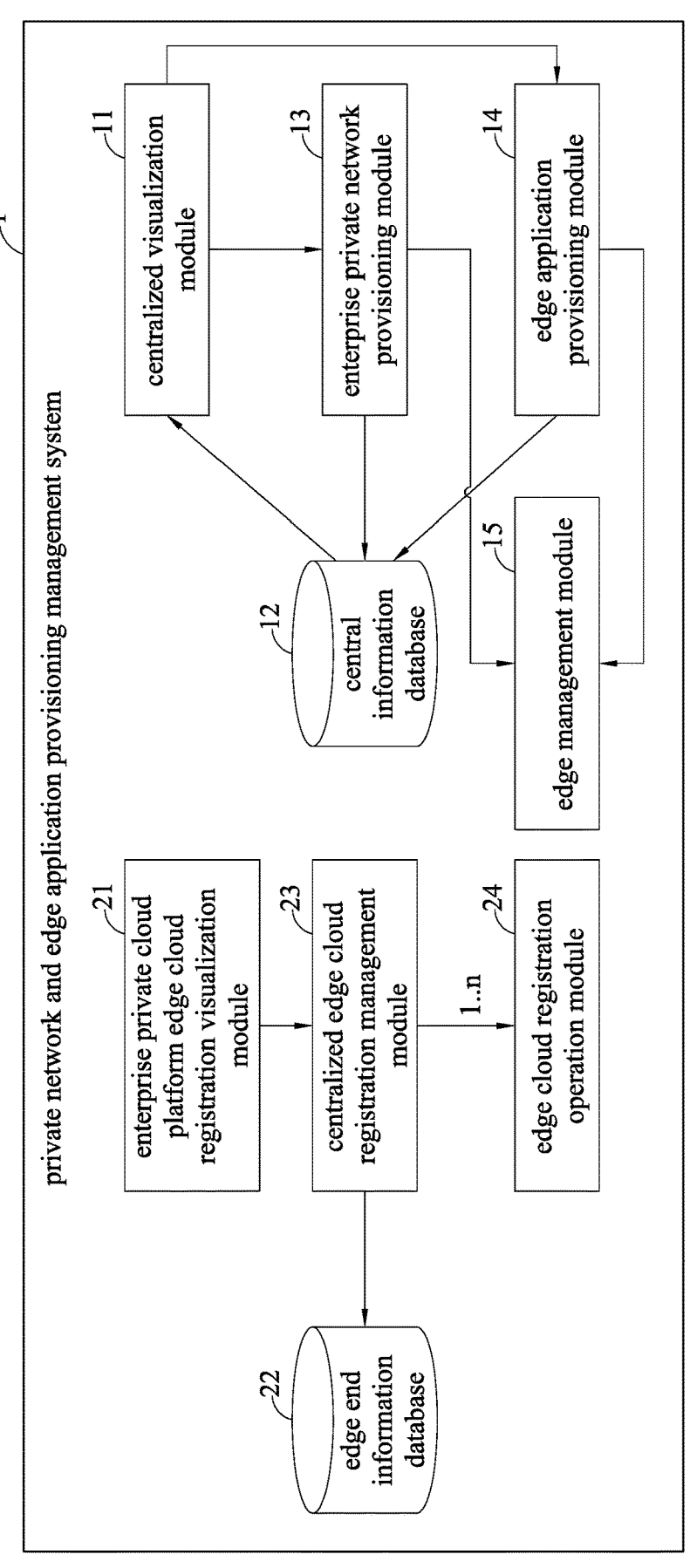
FIG. 2 is a system architecture diagram of another embodiment of a private network and edge application provisioning management system according to the present disclosure.

FIG. 2 is a system architecture diagram of an embodiment of another embodiment of the private network and edge application provisioning management system according to the present disclosure. This embodiment mainly describes the enterprise private cloud platform remote registration mechanism, in which the modules providing the enterprise private cloud platform and the edge application provisioning mechanism such as the centralized visualization module 11, the central information database 12, the enterprise private network provisioning module 13, the edge application provisioning module 14 and the edge management module 15 are already described with reference to FIG. 1. Therefore, those modules are not repeatedly described herein. In this embodiment, the private network and edge application provisioning management system 1 further includes an enterprise private cloud platform edge cloud registration visualization module 21, an edge end information database 22, a centralized edge cloud registration management module 23, and edge cloud registration operation modules 24.

The enterprise private cloud platform edge cloud registration visualization module 21 is configured to provide a cloud central visualization interface for the user to register multiple enterprise private cloud platforms and to monitor the progress of the registration and the state of the enterprise private cloud platforms. In short, the enterprise private cloud platform edge cloud registration visualization module 21 can provide a friendly cloud centralized visualization interface through which the user can register multiple enterprise private cloud platforms and monitor the progress of the registration and the state of the enterprise private cloud platforms.

The edge end information database 22 is configured to record the information and the state of each enterprise private cloud platform, and to differentiate the enterprise private cloud platforms by different area identification codes. In other words, the edge end information database 22 mainly records the information and the state of each enterprise private cloud platform, and differentiates the enterprise private cloud platforms by different area identification codes.

The centralized edge cloud registration management module 23 is configured to process the remote registration of the enterprise private cloud platforms and to record the configuration information of the services executed by the registered enterprise private cloud platforms in the edge end information database 22. In short, the centralized edge cloud registration management module 23 is configured for the unified coordination and management of each edge cloud registration operation module 24. The centralized edge cloud registration management module 23 and each edge cloud registration operation module 24 communicate mainly through a management network and utilize the configuration information of the services executed by the enterprise private cloud platforms recorded and registered by the edge end information database 22.

Specifically, the centralized edge cloud registration management module 23 schedules the process of the remote registration of the enterprise private cloud platforms, monitors the progress of the registration of each enterprise private cloud platform, and ensures the process of the registration. Finally, the centralized edge cloud registration management module 23 records the information of each enterprise private cloud platform and controls the state of each enterprise private cloud platform, and provides information to the administrator interface for viewing.

The edge cloud registration operation modules 24 are configured to receive the instructions issued by the centralized edge cloud registration management module 23 to execute corresponding operations to achieve the remote registration of all of the enterprise private cloud platforms, and the centralized edge cloud registration management module 23 coordinates and manages all of the enterprise private cloud platforms. In short, the edge cloud registration operation module 24 exists at the edge end and is mainly configured to receive the instructions issued by the centralized edge cloud registration management module 23 and execute corresponding operations to achieve the remote registration of the enterprise private cloud platforms.

Specifically, the edge cloud registration operation modules 24 complete the actions required for the registration for managing the enterprise private cloud platforms according to the instructions of the centralized edge cloud registration management module 23, which may include the reception activation of the edge management module 15, adjusting the settings of the network connection between the cloud platforms and the edge management module 15, and establishing the cloud platform resources.

In an embodiment, after the deployment of hardware equipment of an enterprise private cloud platform is completed, the edge cloud registration operation module 24 sends a registration notification to the centralized edge cloud registration management module 23. After the centralized edge cloud registration management module 23 confirms that the current private cloud platform has not completed the registration, the centralized edge cloud registration management module 23 sends instructions in three stages, thereby instructing the edge cloud registration operation module 24 to activate the edge management module 15, to adjust the settings of the edge management module 15 according to environmental information, and to perform the data initialization and the establishment of cloud platform resources of the edge management module 15 in accordance with the aforementioned instructions of the three stages.

The most important part of the aforementioned enterprise private cloud platform remote registration mechanism is the standardization and the remote execution of the originally complex process of the registration, and the automatic completion of a series of actions of the registration according to the standardized process.

Figure 3:
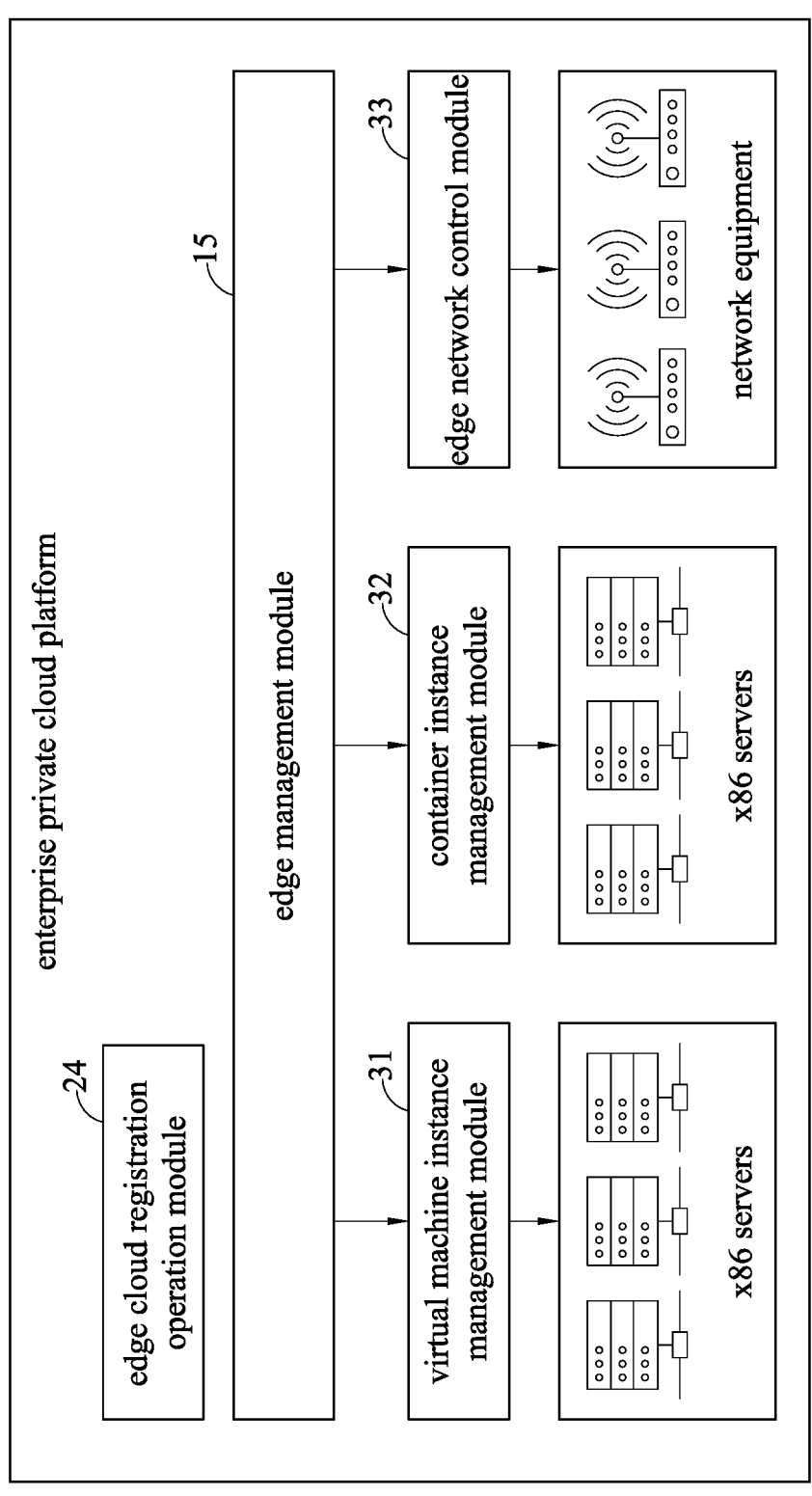
FIG. 3 is a schematic diagram of the architecture of the modules executed on an enterprise private cloud platform according to the present disclosure.

FIG. 3 is a schematic diagram of an embodiment of the architecture of the modules executed on an enterprise private cloud platform according to the present disclosure. This embodiment mainly illustrates the relevant modules to be executed in the enterprise private cloud platform. As mentioned above, regardless of the setup mechanism or the registration mechanism, there are modules at the edge end, i.e., the edge management module 15 and the edge cloud registration operation module 24. The above two modules are not deployed in the central part of the cloud, but near the enterprise customer, so their location is called the edge end. In addition to the edge management module 15 and the edge cloud registration operation module 24 shown in FIG. 2, the modules executed on the enterprise private cloud platform further include the virtual machine instance management module 31, the container instance management module 32 and the edge network control module 33.

Specifically, please also refer to FIG. 2. The edge cloud registration operation module 24 is configured for the activation and the initial setting of modules related to the edge end. The edge cloud registration operation module 24 is mainly configured to receive the instructions issued by the centralized edge cloud registration management module 23 and to execute corresponding operations to achieve the remote registration of the enterprise private cloud platform. The edge management module 15 is mainly configured for receiving operation commands from the enterprise private network provisioning module 13 and the edge application provisioning module 14.

In the first scenario, the command type is provisioning/modifying/deleting a virtual machine, then the edge management module 15 calls the virtual machine instance management module 31 to perform operations related to virtual machine services. In the second scenario, the command type is provisioning/modifying/deleting a container, then the edge management module 15 calls the container instance management module 32 to perform operations related to container services. In the third scenario, the command type is adding/modifying/deleting network-related settings, then the edge management module 15 calls the edge network control module 33 to perform operations related to switches or routers of the enterprise private cloud platform.

Figure 4:
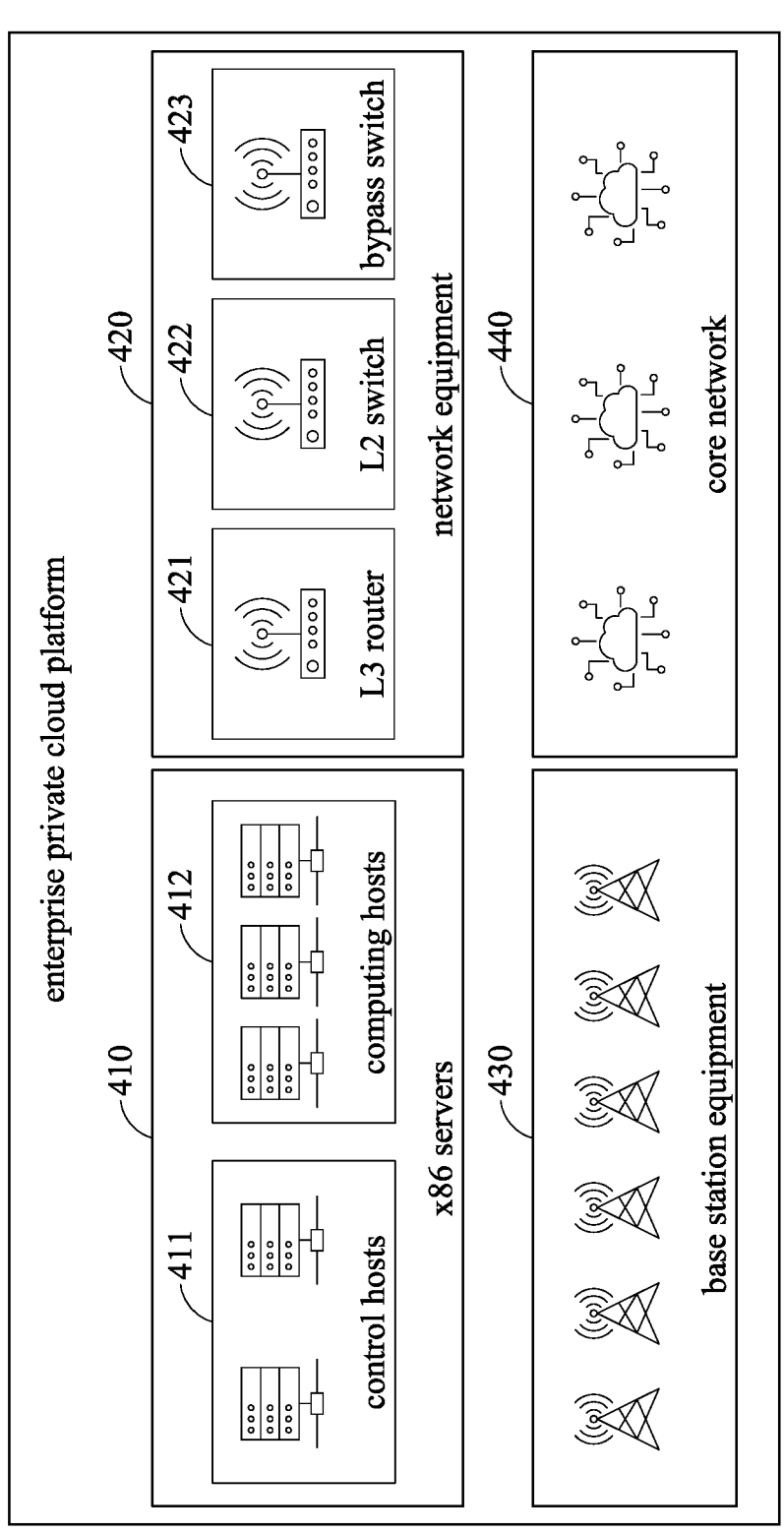
FIG. 4 is a schematic diagram of the architecture of the device configuration of an enterprise private cloud platform according to the present disclosure.

FIG. 4 is a schematic diagram of the architecture of the device configuration of an enterprise private cloud platform according to the present disclosure. Please also refer to FIG. 3. The present disclosure provides a standardized enterprise private cloud platform architecture suitable for enterprise private networks. The user can, through the enterprise private cloud platform remote registration mechanism, complete the deployment of an enterprise private cloud environment, wherein the x86 server 410 is composed of at least two control hosts 411 and at least two computing hosts 412. This arrangement provides the enterprise private cloud platform with an active/active (AA) architecture, with at least two control hosts and at least two computing hosts running at the same time. Each host in the control host cluster and the computing host cluster exists in a manner of mutual redundancy. When one of the hosts fails, another available host of the same type will take over to support the workload. The network equipment 420 includes L3 (Layer 3) routers 421, L2 (Layer 2) switches 422 and bypass switches 423, which will be controlled by the edge network control module 15.

In addition, the base station equipment 430 is the base stations available in the service area of the enterprise private network. The core network 440 may be a physical dedicated device or a virtualized core network, which may be deployed inside the enterprise private cloud platform for the exclusive use of the enterprise, or share the core network with other enterprises or the general public when the budget of the enterprise is limited. Through the above standardized configuration framework, together with the enterprise private cloud platform remote registration mechanism proposed by the present disclosure, the enterprise private cloud platform can be established.

Figure 5:
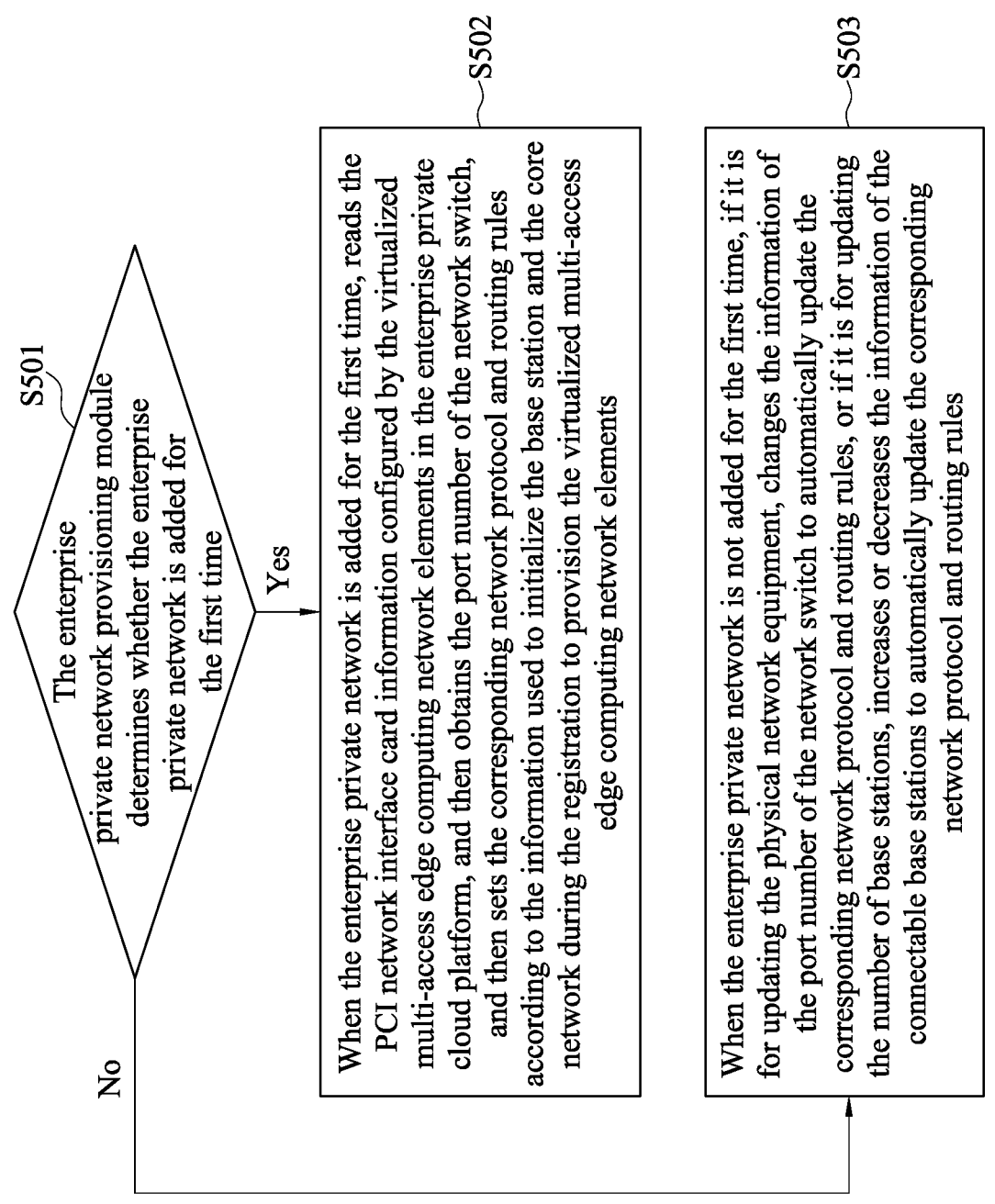
FIG. 5 is a flowchart of a private network and edge application provisioning management method according to the present disclosure.

FIG. 5 is a flowchart of a private network and edge application provisioning management method according to the present disclosure.

At step S501, the enterprise private network provisioning module determines whether the enterprise private network is added for the first time. This step explains that when the enterprise private network provisioning module receives a setup request, the enterprise private network provisioning module first determines whether the enterprise network is added for the first time. When it is added for the first time, the flow proceeds to step S502. Otherwise, the flow proceeds to step S503.

At step S502, the PCI network interface card information configured by the virtualized multi-access edge computing network elements in the enterprise private cloud platform is read to obtain the port number of the network switch, and then the corresponding network protocol and routing rules is set according to the information used to initialize the base station and the core network during the registration to provision the virtualized multi-access edge computing network elements. This step explains the procedure to be performed for the first-time addition, including reading the PCI network interface card information configured by the virtualized multi-access edge computing network elements in the enterprise private cloud platform, obtaining the port number of the network switch according to the PCI network interface card information, and then setting the corresponding network protocol and routing rules according to the information of the base stations and the core network during the registration, so as to finish the setup of the virtualized multi-access edge computing network elements.

At step S503, when the enterprise private network is not added for the first time, if it is for updating the physical network equipment, the information of the port number of the network switch is changed to automatically update the corresponding network protocol and routing rules, or if it is for updating the number of base stations, the information of the connectable base stations is increased or decreased to automatically update the corresponding network protocol and routing rules. In other words, when updating the physical network equipment, the following operations are performed: firstly, changing the port number of the network switch; secondly, updating the number of the base stations, i.e., increasing or decreasing the information of connectable base stations. Each of the two aforementioned operations dynamically updates the corresponding network protocols and routing rules. Specifically, this step describes that the main focus of the procedure to be performed for non-first-time additions is updating relevant information and network settings. For updating the physical network equipment, the main focus is changing the port number of the network switch, and then automatically updating the corresponding network protocol and routing rules. For updating the number of base stations, the main focus is increasing or decreasing the information of connectable base stations, and then automatically updating the corresponding network protocol and routing rules.

For provisioning edge applications, the following steps may be executed: Firstly, the edge application provisioning module determines whether the image file of the edge application service to be provisioned exists. If it exists, start updating of the deployment parameters, and then, according to the type of the image file, provision the edge application service as a virtual machine or a container in the enterprise private cloud platform, so that the state of the edge application service is "in processing." After the provisioning is completed, change the state of the edge application service from "in processing" to "running." Next, the edge application provisioning module determines whether the enterprise private network has been completely established (i.e., connecting the virtualized MEC network elements to the mobile network), and if so, the edge application provisioning module further determines whether to execute the provisioning of the edge application service and the enterprise private network, and if not, the edge application provisioning module further determines whether to modify the network segment of the enterprise network, and if so, the edge application provisioning module modifies the network segment of the enterprise network, and if not, then the edge application provisioning module further determines whether to provision the enterprise network, and if yes, then the edge application provisioning module executes the provisioning of the connection function of the enterprise network, and if not, then the entire provisioning procedure is completed.

Moreover, the center of the cloud may manage and control the edge end devices through the edge management module. In other words, the edge management module may receive the commands issued by the enterprise private network provisioning module and the edge application provisioning module at the center of the cloud, and the edge management module may call the virtual machine instance management module, the container instance management module and the edge network control module to perform provisioning/modification/deletion operations on virtual machine services, container services, and switches or routers of the enterprise private cloud platform, respectively.

For executing the procedure of remote registration, the following steps may be executed: After the deployment of hardware equipment of the enterprise private cloud platform is completed, the edge cloud registration operation module may send a registration notification to the centralized edge cloud registration management module, and after the centralized edge cloud registration management module confirms that the current private cloud platform has not completed the registration, the centralized edge cloud registration management module sends instructions in three stages, so that the edge cloud registration operation module executes the instructions. The instructions of the three stages include activating the edge management module, adjusting the settings of the edge management module according to environmental information, and perform the data initialization and the establishment of cloud platform resources of the edge management module, respectively.

Figure 6:
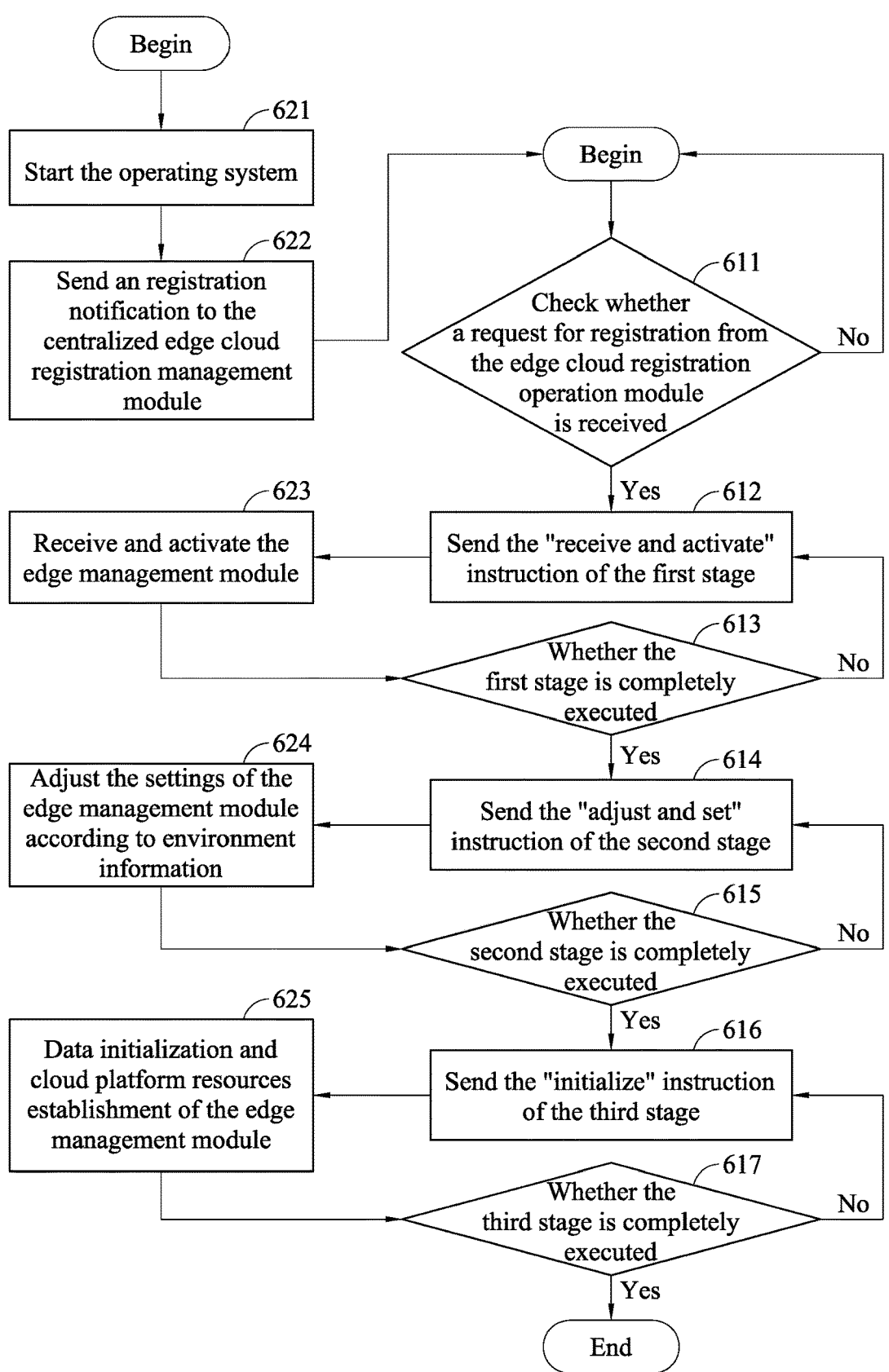
FIG. 6 is a flowchart of remote registration performed by an enterprise private cloud platform according to the present disclosure.

FIG. 6 is a flowchart of remote registration performed by an enterprise private cloud platform according to the present disclosure. This process mainly illustrates how to perform the remote registration of an enterprise private cloud platform, i.e., executing the related procedure through the enterprise private cloud platform remote registration mechanism of the present disclosure when the system receives a request for registering an enterprise private cloud platform. Please also refer to FIG. 2.

As shown in FIG. 6, the right half is the operating procedure of the centralized edge cloud registration management module 23, which includes the processes 611 to 617, and the left half is the operating procedure of the edge cloud registration operation module 24, which includes the processes 621 to 625. In actual operation, the hardware facilities of the enterprise private cloud platform, including x86 servers, L3 routers, L2 switches, bypass switches, base stations, and the core network (which may be shared with other users or may be a private core network), are installed in the enterprise. When the hardware deployment is completed, the power is turned on and the process 621 is executed, that is, the edge cloud registration operation module 24 is activated when the x86 devices are being booted, and then the flow enters the process 622, when the edge cloud registration operation module 24 is activated, a registration notification is sent to the centralized edge cloud registration management module 23, and then the flow enters the process 611, the centralized edge cloud registration management module 23 continuously checks whether there is an enterprise private cloud platform to be registered. When the centralized edge cloud registration management module 23 receives a request for registration, the centralized edge cloud registration management module 23 checks whether the registration of the cloud platform has been completed in order to avoid repeated registration actions. When a request for registration is found, the centralized edge cloud registration management module 23 executes the three-stage registration procedure.

The first stage is to request to receive the enterprise private cloud platform management control element and activate the element, i.e., the central end sends instructions to the edge end. The process 612 sends the "receive and activate" instruction to the edge cloud registration operation module 24. The process 623 receives and activates the edge management module 15 at the edge end, and then replies to the centralized edge cloud registration management module 23 after finishing the reception and the activation of the edge management module 15. The process 613 determines whether the registration instructions of the first stage are completely executed. If they are not completely executed, then the flow returns to the process 612 to continue to send the next registration instruction. If they are completely executed, then the flow performs the second stage of the registration.

The second stage is to request for the adjustment of network settings of the connection between the cloud platform and the edge management module 15, wherein an instruction is also sent from the central end to the edge end. The process 614 is to send an "adjust and set" instruction to the edge cloud registration operation module 24, and then the flow enters the process 624 to adjust the settings of the edge management module according to environment information, and then a response is sent to the centralized edge cloud registration management module 23 after the adjustment of the settings is completed. The process 615 determines whether the registration instructions of the second stage are completely executed. If they are not completely executed, then the flow returns to the process 614 to continue to send the next registration instruction. If they are completely executed, then the flow performs the third stage of the registration.

The third stage initializes the edge management control element, cloud platform computing resources, network resources, and settings and data required for the provisioning of application services, wherein an instruction is also sent from the central end to the edge end. The process 616 is to send the "initialize" instruction to the edge cloud registration operation module 24. The process 625 is to follow the instruction to perform data initialization and cloud platform resources establishment of the edge management module 15, and then reply to the centralized edge cloud registration management module 23 after the data initialization and the cloud platform resources establishment are completed. The process 617 determines whether the registration instructions of the third stage are completely executed. If they are not completely executed, then the flow returns to the process 616 to continue to send the next registration instruction. If they are completely executed, then the processes of the registration is finished.

In addition, the processes 613, 615 and 617 may be set up with timeout mechanism to avoid incorrect behaviors of remote registration processes due to network anomalies. All the registration processes of the above stages are performed remotely and automatically. Each process sends a notification to the enterprise private cloud platform edge cloud registration visualization module 21 and the edge end information database 22 when it is completed to request to write and update the information. This helps enterprise users to automatically complete the deployment and the setup of enterprise private cloud platforms through standardized processes.

Figure 7:
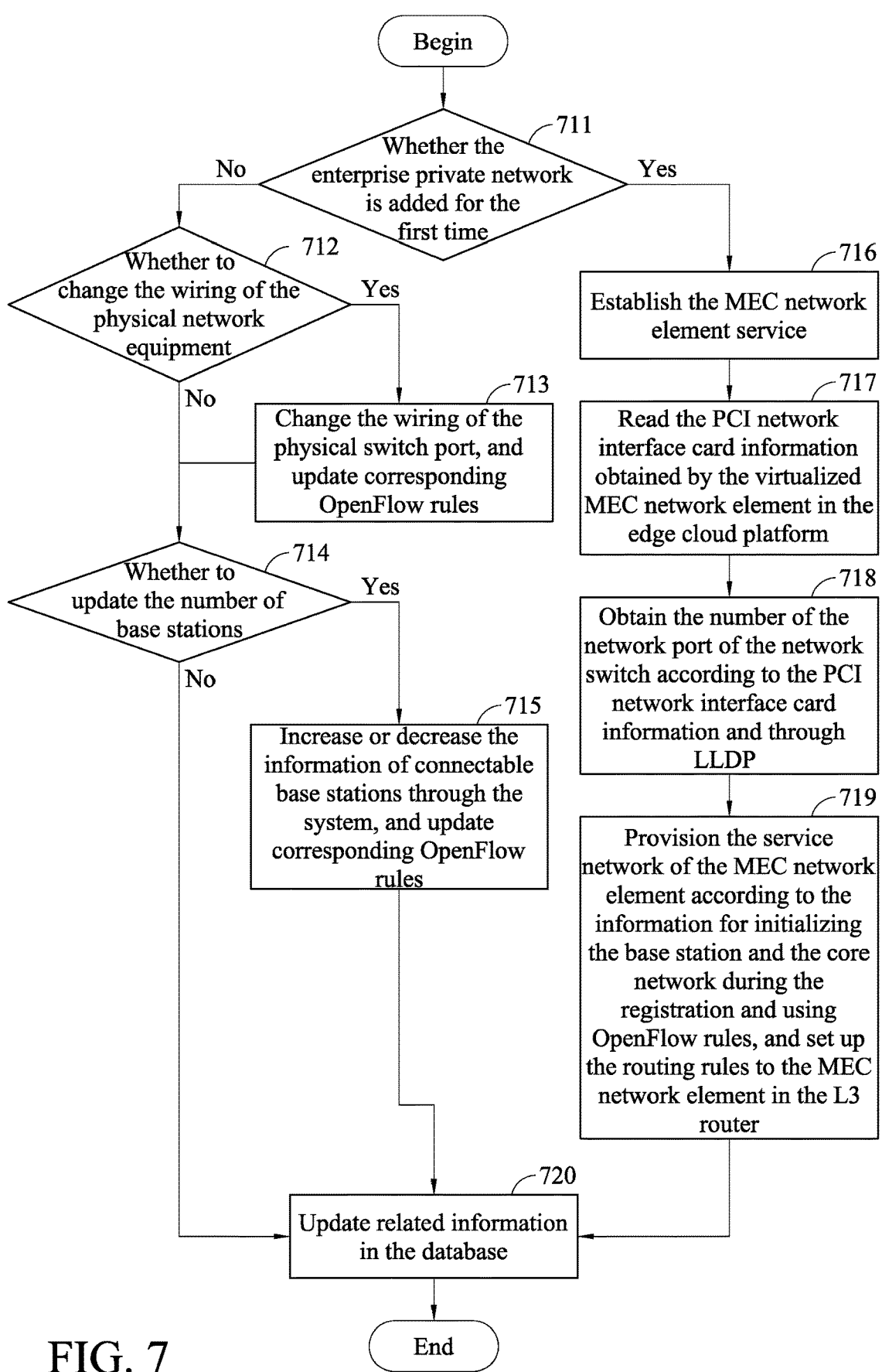
FIG. 7 is a flowchart of enterprise network provisioning according to the present disclosure.

FIG. 7 is a flowchart of enterprise network provisioning of an embodiment according to the present disclosure. This embodiment mainly illustrates how to perform enterprise network provisioning, i.e., how to enable enterprise private network services on enterprise private cloud platforms. Please also refer to FIG. 2. The flow of this embodiment is executed in the enterprise private network provisioning module 13.

First of all, the user may perform operations related to the enterprise private cloud platform through the friendly visualized interface provided by the centralized visualization module 11 to select the enterprise private cloud platform to be controlled, enter the enterprise private network management web page, and activate the enterprise private network service. At this moment, the centralized visualization module 11 calls the enterprise private network provisioning module 13. In other words, the centralized visualization module 11 provides a friendly visualized operation interface for managing the enterprise private cloud platform, thereby the user can manage the cloud platforms that are already registered and trigger the corresponding modules to perform actions. The user can manage the specified private cloud platform by entering the enterprise private network management visualization interface.

In addition, the enterprise private network provisioning module 13 exchanges information with the edge management module 15 and then calls the virtual machine instance management module 31, the container instance management module 32 and the edge network control module 33 shown in FIG. 3 respectively according to the type of task request to obtain information of application services that exist in the form of virtual machines or containers and update routing rules and related OpenFlow rules of the network equipment.

The process 711, which determines whether an enterprise private network is activated for the first time, may include the first scenario for the first-time update and the second scenario for the non-first-time addition. In the first scenario, if it is the first-time update, the process 716 is executed to generate the virtualized MEC network element service, that is, to create the virtualized MEC network element service in the enterprise private cloud platform. In the process 717, the PCI network interface card information configured in the virtualized MEC network element is read, which includes IP network address, network interface card Slot ID and MAC, etc. In the process 718, the obtained network interface card information is used to find the L2 switch connection port number corresponding to the network port of the computing node through the Link Layer Discovery Protocol (LLDP) in the L2 switch. In the process 719, the initialization data of the virtualized network element of the third stage in the process 616 in FIG. 6 is used to provision the network between the network element, the base station and the core network, provision the network connection mechanism with the virtualized MEC network element service through the OpenFlow rules, and set up the routing rules to the MEC network element in the first virtual router gateway (Gateway-1) of the L3 physical router device.

Specifically, for provisioning the virtualized MEC network element on enterprise private cloud platform, using cloud-based technology, the user can choose to provision a standalone version of the virtualized MEC network element or a virtualized MEC network element with high availability (HA) architecture, which is executed with A-S (Active-Standby) architecture. When an MEC network element fails, another MEC service on standby will be activated to take over all the work. A unique identification code will be provided after the virtualized MEC is provisioned. The enterprise private network provisioning module 13 will obtain the PCI network interface card information of its network element in the cloud platform computing node based on this identification code, wherein the information includes IP network address, network interface card Slot ID and MAC, etc., and then the network element's PCI NIC information in the cloud platform computing node, including IP network address, NIC Slot ID and MAC, etc., and then the port number of the network switch used by the virtualized MEC network element is confirmed through the LLDP technology. Therefore, when the virtualized MEC network element is provisioned on the enterprise private cloud platform for the first time, the network is provisioned according to the data of the third stage of the process 616 in the enterprise private cloud platform registration mechanism (FIG. 6). The obtained virtualized MEC network element uses the switch port number information to automatically set the corresponding OpenFlow rules in the L2 switch. The setting of the network connection between this network element, the base station and core network is completed, and the routing rules to the virtualized MEC network element are automatically set in the first virtual router gateway (Gateway-1) of the L3 physical router device. After the enterprise private network is provisioned, the second scenario may be executed.

In the second scenario, if the virtualized MEC network element already exists, the process 712 is executed, i.e. to determine whether to change the wiring of the physical network equipment; if so, the flow enters the process 713, which updates the OpenFlow rules corresponding to the L2 switch for the changed network port; if not, the flow enters the process 714, and then determines whether to update the base stations to which this MEC network element is connected; if so, the flow enters the process 715, which further provides the information of the base station to which the user dynamically adjusts and connects, and updates the Open-Flow rules corresponding to the switch; if no, there will be no change. Finally, the flow enters the process 720 to update the data of the change during the enterprise network provisioning process to the central information database 12.

Specifically, when the wiring of the network port of the physical switch is changed, the OpenFlow rule settings connecting the base station, the core network and the virtualized MEC network element can be updated through the enterprise private network provisioning module 13. By providing the user with the ability to change the base station to which the MEC network element is connected, the signal coverage area of the mobile network can be adjusted. The related OpenFlow rule settings are automatically updated after the change is completed. Finally, the information is synchronized and displayed, i.e., the database is updated, and the provisioning result and the provisioning state of the enterprise private network is displayed through the centralized visualization module 11.

Figure 8:
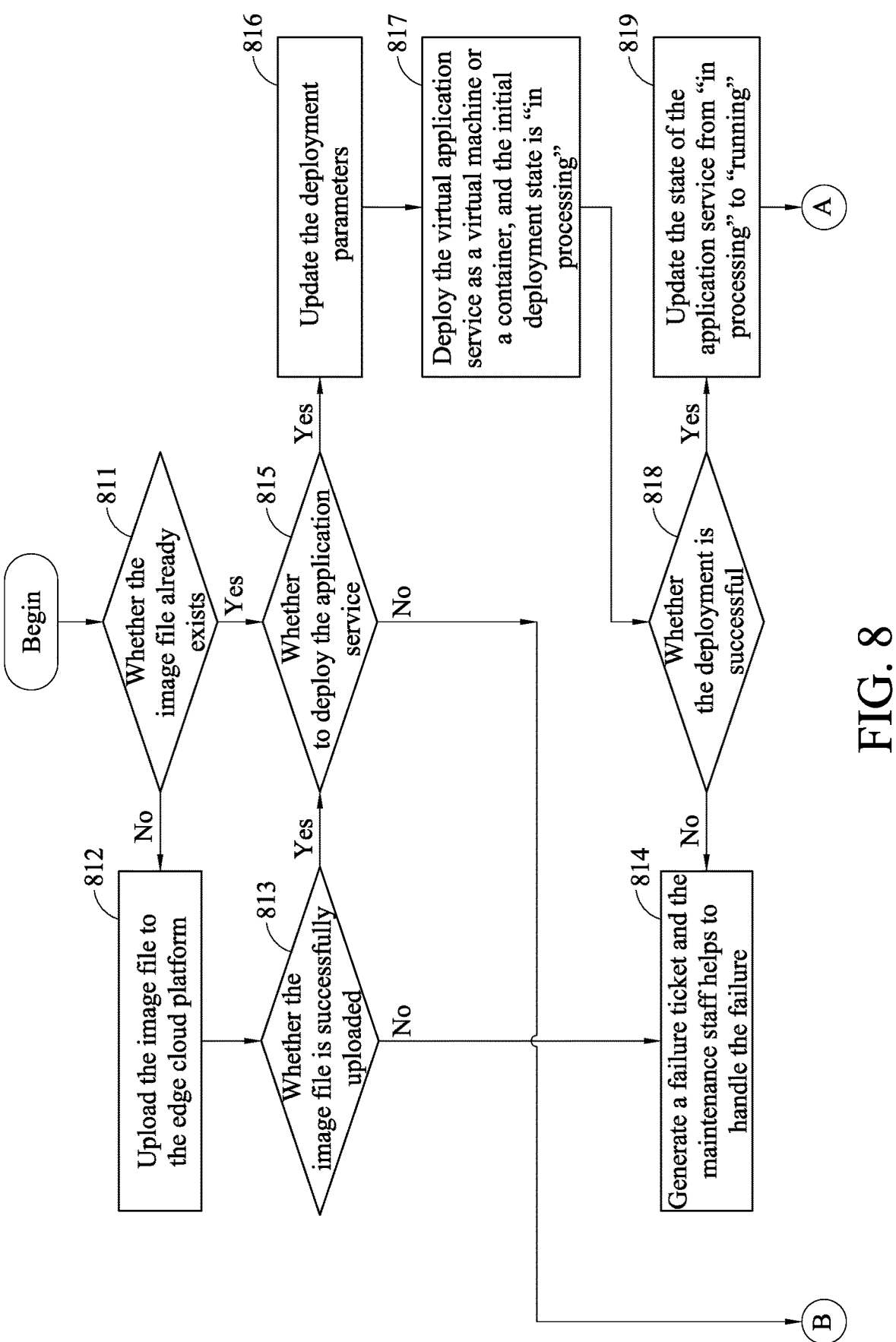
FIG. 8 is a flowchart of edge application provisioning according to the present disclosure.
Figure 8:
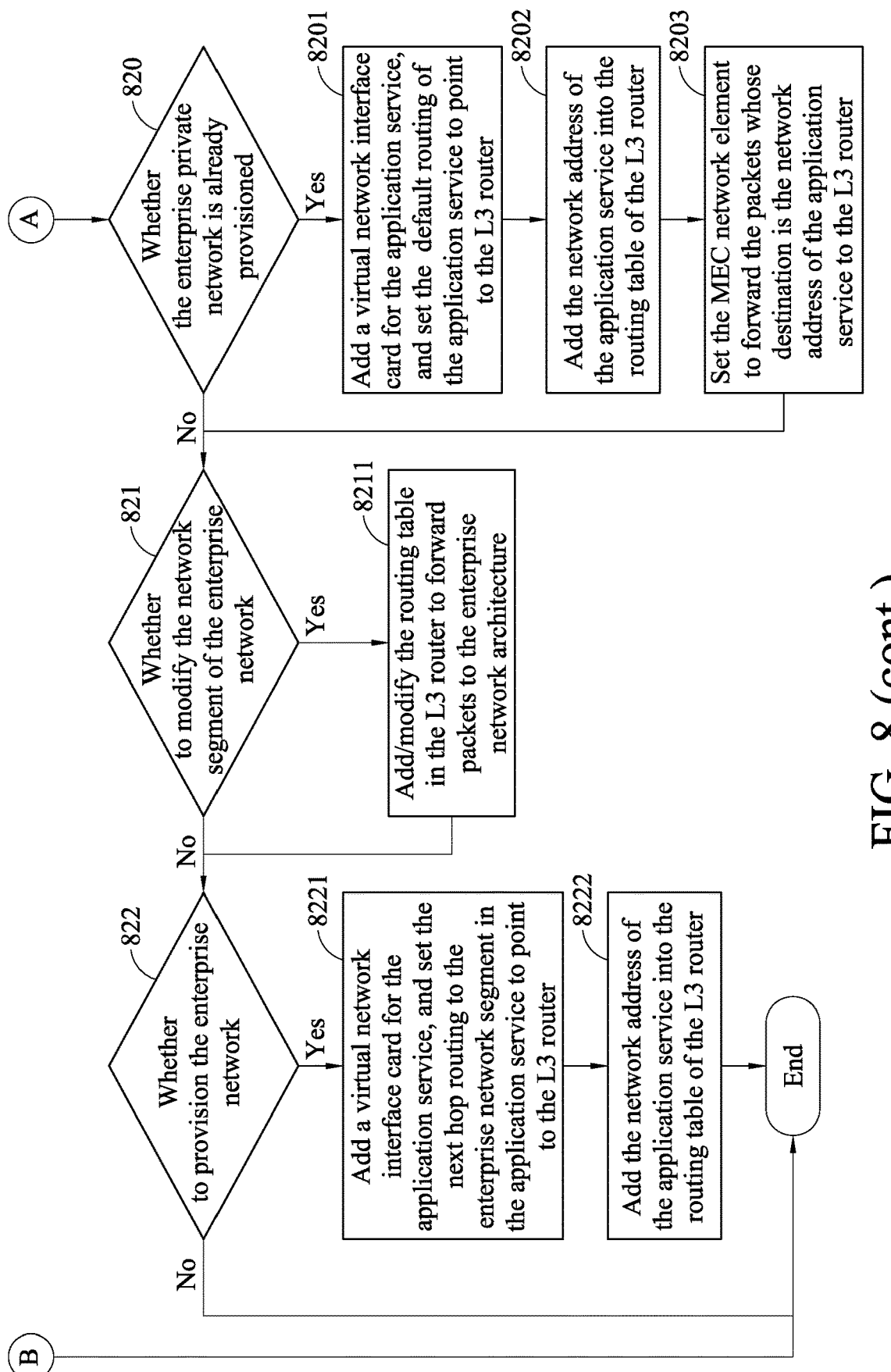

FIG. 8 is a flowchart of edge application provisioning of an embodiment according to the present disclosure. Through this flow, application services can be established on the enterprise private cloud platform, the application services can be packaged in the form of virtual machines or containers, the functions of provisioning enterprise private network and existing physical network of enterprise customer can be provided, so that enterprise users can access the application services established on enterprise private cloud platform in the service area of the base station and through the existing network of the enterprise. Please also refer to FIG. 2. The flow of this embodiment is executed in the edge application provisioning module 14.

The user may manage the enterprise private cloud platform, select a cloud platform that is already registered, enter the edge application management web page, and select to add an edge application service through a friendly visualized interface provided by the centralized visualization module 11. At this moment, the centralized visualization module 11 exchanges information with the edge application provisioning module 14. In other words, the centralized visualization module 11 provides a friendly visualized operation interface for managing the enterprise private cloud platform. The user can manage the cloud platforms that are already registered and trigger the corresponding modules to perform actions. The user can enter the edge application service management visualization interface to manage the application services of the specified private cloud platform.

Moreover, the edge application provisioning module 14 exchanges information with the edge management module 15 and then call the virtual machine instance management module 31, the container instance management module 32 and the edge network control module 33 shown in FIG. 3 respectively according to the type of task request to provision the application services and update the routing rules of the L3 physical router and the OpenFlow rules of the L2 physical switch.

In the process 811, the currently available application service image files are displayed. If the image file of the edge application service to be provisioned exists, whether to proceed with the provisioning will be determined through the process 815; conversely, if the image file does not exist, the flow will enter the process 812 to upload the image file to enterprise private cloud platform. The process 813 determines whether the image file is successfully uploaded. If the image file is successfully uploaded, the process 815 is executed to determine whether to continue the provisioning. If the upload of the image file fails, the process 814 is executed to generate a failure ticket, and then the failure ticket is transmitted to the maintenance staff to help the user to troubleshoot the image file upload failure issue.

Specifically, the edge application provisioning module 14 provides edge end image file management. When the user expects to provision application services on the selected enterprise private cloud platform through the centralized visualization module 11, the central information database 12 will be searched for the image files available on the enterprise private cloud platform. If the user finds that the image file of the application services expected to be provisioned is not uploaded to the cloud platform yet, the upload of the image files may be finished through that module.

After the user selects the image file, the user proceeds to the process 815 to select whether to deploy the application service. If the user selects not to provision, the process will end after merely uploading the application service image file. If the user selects to continue the provisioning, the user proceeds to the process 816 to adjust the deployment parameters, such as network address, disk space and computing power, etc. After the parameter adjustment is finished, the flow proceeds to the process 817, where the application service is deployed on the enterprise private cloud platform as a virtual machine or a container according to the image file type. At this moment, the state of the application service will be displayed as "in processing" in the centralized visualization module 11. Furthermore, the process 818 monitors the deployment event to determine whether the application service is successfully deployed. If the deployment fails, the process 814 is executed to generate a failure ticket and sends the failure ticket to the maintenance staff to help with handling the deployment failure issue. If the deployment is successful, the flow enters the process 819 to notify the centralized visualization module 11 to update the state of the application service to "running".

Specifically, when an existing image file of the enterprise private cloud platform is selected in the centralized visualization module 11, the edge management module 15 is called to determine whether the image file format is an application service in the form of a virtual machine or a container. If it is a virtual machine, the virtual machine instance management module 31 will be called to activate the application service. If it is a container, the container instance management module 32 will be called to perform the deployment. In addition, the application service deployment state of the edge management module 15 is read through the deployment identification ID. If the application state in the centralized visualization module 11 during the deployment is "in processing," the application state of the centralized visualization module 11 will be updated to "running" if the deployment is successful. If the deployment fails, a failure ticket will be generated, and the failure ticket will be transmitted to the maintenance staff to help with the processing, and the state will be updated to "deployment failure."

Next, the flow proceeds to the process 820 to determine whether the enterprise private network is already provisioned (i.e., connecting the virtualized MEC network element to the mobile network). At this moment, if the enterprise private network is not yet provisioned, the flow enters the process 821. On the contrary, if the enterprise private network is already provisioned and the user requests to connect the application service to the enterprise private network, the flow enters the process 8201 to add a virtual network interface card for the application service, and set the next hop configuration in its default routing rules to point to the first virtual router gateway (Gateway-1) of the L3 physical router device of the enterprise private cloud platform. Next, the flow enters the process 8202 to add the IP routing rules of the virtual network interface card added by the process 8201 into the routing table of the L3 router, so that network traffic can be forwarded to the virtual network interface added by the process 8201 through the L3 router. Next, the flow enters the process 8203 to inform the virtualized MEC network element to forward the network traffic, received by the base station, and whose destination is the IP address of the application service, to the first virtual router gateway of the L3 physical router to be routed, thereby forwarding the traffic to the application service of the enterprise private cloud platform.

In other words, the user can choose whether or not to provision an application service with connection to an enterprise private network, in order to allow mobile terminals to access the application service on the enterprise private cloud platform through the mobile network, wherein the first step is adding a virtual network interface card to the virtual machine or the container where the application service is running, and setting the default routing to point to the first gateway (Gateway-1) of the L3 router. The second step is updating the routing table of the L3 router to add the routing rules to forward the traffic to the virtual network interface card of the application service. The third step is setting the MEC network element to forward the packets whose destination IP address is the IP address of the application service to the first gateway of the L3 router.

As mentioned above, if the enterprise private network has not yet been provisioned (i.e., connecting the virtualized MEC network element to the mobile network) or the provisioning process of the edge application service and the enterprise private network has been completed, the flow enters the process 821 to determines whether to modify the existing physical network segment of the enterprise, such as the office physical network or the wireless network segment. If it is to be modified, the flow enters the process 8211, which adjusts the routing table in the L3 router to forward packets to the existing enterprise physical network. If it is not to be modified, the flow continues to the process 822 to determine whether to provision the enterprise network connection function. If the function is to be provisioned, the process 8221 is executed to add the second virtual network interface card for the application service, and set the next hop routing to the enterprise internal network segment in the application service to point to the second virtual router gateway (Gateway-2) of the L3 physical router. Next, the flow enters the process 8222 to set the routing table in the L3 router to add the routing rules of the network IP address of the second virtual network interface card added in the process 8221. The edge application provisioning flow is completed if the enterprise network connection function is not activated. The above operations will update the relevant data to the central information database 12 when the operations are completed.

Specifically, the user can update the network segment of the existing enterprise network management system to which the application service can connect during the operation stage, and update the routing table of the L3 router for forwarding packets to the enterprise internal network if there is any change. In addition, the user can choose whether to provision the application service with enterprise network connection, so that the existing network equipment in the enterprise can access the application service through, for example, a physical network, an office computer, or a wireless network, wherein the first step is adding a virtual network interface card to the virtual machine or the container where the application service is running. The second step is setting routing rules to send the packets whose destination address falls within the network segment of the enterprise network management system to the second gateway (Gateway-2) of the L3 router through the virtual network interface card. The third step is updating the routing rules to the virtual network interface card of the application service in the routing table of the L3 router. Finally, the information is synchronized and displayed, i.e., the states of the edge application service establishment and the network provisioning result are displayed through the centralized visualization module 11.

In an embodiment, each of the above modules and units may be software, hardware, or firmware; in the case of hardware, the module or the unit may be a processing unit, a processor, a computer, or a server with capabilities of data processing and data computing; in the case of software or firmware, the module or the unit may include instructions that can be executed by a processing unit, a processor, a computer, or a server, and the module or the unit may be installed in the same hardware device or distributed in multiple different hardware devices.

In addition, the present disclosure further discloses a computer-readable medium applied in a computing device or a computer having a processor (e.g., CPU, GPU, etc.) and/or a memory, and storing instructions. The computing device or the computer can be used to execute the computer-readable medium through the processor and/or the memory to perform the methods and the steps described above while executing the computer-readable medium.

In summary, the system, the method, and the computer-readable medium for private network and edge application provisioning management according to the above embodiments of the present disclosure utilize private cloud management technology to enable the builder of an enterprise private network cloud environment to deploy a virtualized MEC network element in an enterprise private cloud platform and automatically provision a network path to a 5G mobile network without limiting the provider (i.e., vendor) of the virtualized MEC network element. Subsequently, the enterprise can deploy software application services required for its business in the enterprise private cloud platform to enable smooth access to software application services by internal mobile terminal devices of the enterprise through the base station or by internal personnel of the enterprise through the existing physical or wireless network. Moreover, the user can set the information of the base station and the core network that the virtualized MEC network element wants to connect to through the friendly visualization interface provided by the present disclosure, and adjust the number of connected base stations according to enterprise requirements. In the signal coverage service area of the base station, the base station in the area can be connected to via mobile devices. If the destination IP address is an IP address of an application service running on an enterprise private cloud platform, the traffic packets will be forwarded into the enterprise private cloud platform; otherwise, the traffic packets will enter the core network and be transmitted to the Internet. Furthermore, the present disclosure provides the function of accessing the existing network architecture within the enterprise, such as wireless networks, office physical wired networks, etc., wherein their traffic is directed to enter the enterprise private cloud platform to access the target service through the Layer 3 network communication protocol. Accordingly, the present disclosure has the following advantages and benefits.

The first advantage is that the present disclosure provides an enterprise private cloud platform remote registration mechanism that packages the cloud management and the cloud platform elements in a virtualized manner, and automates a series of complex remote registration actions using a remote registration module. This remote registration module adopts a master-slave architecture consisting of a central end and an edge end, where the central end mainly manages and controls the actions to be performed by the edge end, and the edge end executes the requests of the central end and reports the status back to the central end. This automation mechanism can simplify the registration of enterprise private cloud platform and shorten the setup time. In addition, the present disclosure provides a visualized operation interface that clearly presents the process and the progress of the remote registration.

The second advantage following the aforementioned first advantage is that the present disclosure proposes a standardized enterprise private cloud deployment architecture and a corresponding method, providing standardized edge basic servers and network equipment, and activating the automatic deployment of enterprise private cloud platforms and management systems to simplify and facilitate enterprise customers to set up a dedicated private cloud environment.

The third advantage following the aforementioned first advantage is that, after the initial automatic deployment of the edge basic server is completed, the edge cloud registration operation module will notify the central end to launch the enterprise private cloud environment registration process, and after the completion of the registration, the infrastructure of the private network can be managed through the visualized interface at the central end, and the related deployment software service operation control can be performed.

The fourth advantage is that, after the registration process is completed, the various cloud central management modules will have the capability of enterprise private cloud platform management.

The fifth advantage is that the present disclosure proposes an enterprise private network deployment management method, which provides the user with an operation interface through the centralized visualization module to remotely deploy a virtualized MEC network element in the enterprise private cloud platform, and automatically provision the network path between this network element, the base station leased by the enterprise and the core network.

The sixth advantage following the aforementioned fifth advantage is that the user can modify the number of base stations connected to the virtualized MEC network element without redeploying the virtualized MEC network element. This feature allows the user to dynamically adjust the effective signal coverage area of the mobile network without service interruption.

The seventh advantage following the aforementioned fifth advantage is that the virtualized MEC network element deployment adopts the A-S (Active-Standby) architecture to deploy two virtualized MEC network elements in enterprise private cloud platform. One MEC network element is the main execution target and the other one MEC network element is in standby state. When an anomaly occurs in the main MEC network element, the standby MEC network element will take over the operation.

The eighth advantage is that the present disclosure provides the edge application provisioning module in the cloud, and the system user can perform various management operations such as uploading application service image files.

The ninth advantage following the aforementioned eighth advantage is that, based on the image files that already exist in the enterprise private cloud platform, the user can deploy and manage various application services in the enterprise private cloud platform through the centralized visualization module, and the application service packaging type is not limited to virtual machine (VM) or container.

The tenth advantage is that the present disclosure provides enterprise users with the function to automatically connect to the 5G network after the application services are deployed on the enterprise private cloud platform. The user can set up the network path between the application services and the 5G network with a single click through the cloud visualization interface. Any certified mobile terminal (e.g., mobile phone, tablet) or hardware device (e.g., notebook computer) with network connection in the service area of the base station will be able to access the internal application services in the private cloud platform through the base station without the need for transmission through the Internet, which can significantly reduce latency and enhance data delivery security.

The eleventh advantage is that the present disclosure provides enterprise users with the function to automatically connect to the enterprise internal network after the application services are deployed on the enterprise private cloud platform. The user can set up the network path between the application services and the existing network architecture of the enterprise user, such as wireless network and office physical wired network, with a single click through the cloud visualization interface. The aforementioned network provisioning function will restrict the network traffic to be executed within a closed network, which will effectively prevent the risk of leakage of highly confidential data of the enterprise.

The twelfth advantage following the aforementioned tenth and eleventh advantages is that the present disclosure is used for network provisioning of the application services. Either one or all of the application services may be provisioned according to requirement.

The thirteenth advantage is that the application services running on the enterprise private cloud platform have cloud-based features, including application service snapshot generation, backup and restoration mechanism, application service activation/deactivation, security group settings and firewall, etc., which are all protected by the present disclosure.

While some of the embodiments of the present disclosure have been described in detail above, it is, however, possible for those of ordinary skill in the art to make various modifications and changes to the particular embodiments shown without substantially departing from the teaching and advantages of the present disclosure. Such modifications and changes are encompassed in the spirit and scope of the present disclosure as set forth in the appended claims.

What is claimed is:

1. A private network and edge application provisioning management system, comprising:

a centralized visualization module configured to provide an operation interface for a user to manage an enterprise private cloud platform, so as to enable an enterprise private network service, provisioning a network, and deploy and manage various edge application services on the enterprise private cloud platform;

a central information database configured to store information related to the edge application services and an enterprise private network of the enterprise private cloud platform, so as to provide browsing information corresponding to different users according to permissions of the users, wherein the browsing information is displayed by the centralized visualization module;

an enterprise private network provisioning module configured to handle network establishment of the enterprise private network, wherein the network establishment comprises provisioning of a virtualized multi-access edge computing network element and connection management of a base station and a core network;

an edge application provisioning module configured to perform lifecycle management of an edge application service and to provide application service communication network provisioning function and enterprise internal network connection provisioning function;

an edge management module configured to execute and process commands issued by the enterprise private network provisioning module and the edge application provisioning module, so as to manage and control a lifecycle and network settings of the edge application service;

an enterprise private cloud platform edge cloud registration visualization module configured to provide a cloud central visualization interface for the user to register a plurality of the enterprise private cloud platforms, and to monitor registration progress and states of the enterprise private cloud platforms;

an edge end information database configured to record information and state of each of the enterprise private cloud platforms, and to differentiate the enterprise private cloud platforms by different area identification codes;

a centralized edge cloud registration management module configured to process remote registration of the enterprise private cloud platforms, and to record configuration information of services running on the registered enterprise private cloud platforms in the edge end information database; and an edge cloud registration operation module configured to receive an instruction issued by the centralized edge cloud registration management module to execute corresponding actions to achieve the remote registration of all of the enterprise private cloud platforms, wherein the centralized edge cloud registration management module coordinates and manages all edge cloud registration operation modules in a unified manner.

2. The private network and edge application provisioning management system according to claim 1, wherein the enterprise private network provisioning module determines whether the enterprise private network is added for a first time, and when the enterprise private network is added for the first time, the enterprise private network provisioning module reads Peripheral Component Interconnect standard network interface card information configured by the virtualized multi-access edge computing network element in the enterprise private cloud platform, and obtains a port number of a network switch to provision the virtualized multi-access edge computing network element according to information for initializing the base station and the core network during a registration, and when the enterprise private network is not added for the first time, the enterprise private network provisioning module changes information of the port number of the network switch, or increases or decreases information of connectable base stations, so as to automatically update corresponding network protocol and routing rules.

3. The private network and edge application provisioning management system according to claim 1, wherein the edge application provisioning module performs provisioning with an image file of the edge application service existing, and after deployment parameters are adjusted, the edge application provisioning module provisions the edge application service as a virtual machine or a container on the enterprise private cloud platform according to a type of the image file to finish network provisioning of the enterprise private network, network segment modification of an enterprise network, or provisioning of connection function of the enterprise network.

4. The private network and edge application provisioning management system according to claim 1, wherein the edge management module calls the virtual machine instance management module, the container instance management module and the edge network control module to perform various operation commands on virtual machine services, container services, and switches or routers of the enterprise private cloud platform, respectively.

5. The private network and edge application provisioning management system according to claim 1, wherein after hardware equipment of the enterprise private cloud platform is completely installed, the edge cloud registration operation module sends a registration notification to the centralized edge cloud registration management module, so that the centralized edge cloud registration management module confirms that the private cloud platform is not yet registered and then sends instructions in three stages to request the edge cloud registration operation module to respectively activate the edge management module, to adjust settings of the edge management module according to environment information, and to perform data initialization and cloud platform resource establishment of the edge management module.

6. A private network and edge application provisioning management method, comprising:

determining, by an enterprise private network provisioning module, whether an enterprise private network is added for a first time;

when the enterprise private network is added for the first time, reading Peripheral Component Interconnect standard network interface card information configured by a virtualized multi-access edge computing network element in an enterprise private cloud platform, and obtaining a port number of a network switch to set corresponding network protocol and routing rules according to information for initializing the base station and the core network during a registration to provision the virtualized multi-access edge computing network element;

when the enterprise private network is not added for the first time, and when physical network equipment is to be updated, changing information of the port number of the network switch to automatically update corresponding network protocol and routing rules, or when a number of base stations is to be updated, increasing or decreasing information of connectable base stations to automatically update corresponding network protocol and routing rules;

updating, by an edge application provisioning module, deployment parameters when an image file of an edge application service to be deployed exists;

deploying the edge application service as a virtual machine or a container on the enterprise private cloud platform according to a type of the image file, so that a state of the edge application service is "in processing," and changing the state of the edge application service from "in processing" to "running" after the deployment is completed;

determining, by the edge application provisioning module, whether an enterprise private network is already provisioned to complete network provisioning of the enterprise private network or whether to modify a network segment of an enterprise network to complete the segment modification of the enterprise network, or whether to provision the enterprise network to provision a connection function of the enterprise network;

receiving, by an edge management module, commands issued by the enterprise private network provisioning module and the edge application provisioning module, and performing various operations respectively on virtual machines services, container services, and switches or routers of the enterprise private cloud platform by calling the virtual machine instance management module, the container instance management module and the edge network control module;

after hardware equipment of the enterprise private cloud platform is completely installed, sending, by an edge cloud registration operation module, a registration notification to a centralized edge cloud registration management module; and after the centralized edge cloud registration management module confirms that the private cloud platform is not yet registered, sending instructions in three stages to request the edge cloud registration operation module to respectively activate the edge management module, to adjust settings of the edge management module according to environment information, and to perform data initialization and cloud platform resource establishment of the edge management module.

7. A computer-readable medium, storing instructions therein, when executed by a computing device or a computer, cause the computing device or the computer to implement the private network and edge application provisioning management method according to claim 6.

* * * * *